United States Patent [19]

Van Dijk et al.

[11] Patent Number: 4,551,441

[45] Date of Patent: Nov. 5, 1985

[54] NICKEL BORIDE-POLYMER IN-OIL CATALYST

[75] Inventors: Cornelis Van Dijk, Zwijndrecht; Rudolph O. De Jongh, The Hague, both of Netherlands

[73] Assignee: Internationale Octrooi Maatscappij "Octropa" B.V., Rotterdam, Netherlands

[21] Appl. No.: 629,967

[22] Filed: Jul. 11, 1984

[30] Foreign Application Priority Data

Jul. 20, 1983 [NL] Netherlands .......................... 8302590

[51] Int. Cl.$^4$ .............................................. B01J 31/06
[52] U.S. Cl. .................................... 502/159; 502/207; 260/409; 564/490
[58] Field of Search ................................ 502/159, 207

[56] References Cited

U.S. PATENT DOCUMENTS

| 1,201,226 | 10/1916 | Ellis | 502/207 X |
| 2,084,687 | 6/1937 | Jespersen | 87/12 |
| 4,072,720 | 2/1978 | Haag et al. | 260/618 H |
| 4,339,345 | 7/1982 | Nakao et al. | 502/207 X |

FOREIGN PATENT DOCUMENTS

| 2307852 | 9/1974 | Fed. Rep. of Germany | 502/207 |
| 2519580 | 11/1976 | Fed. Rep. of Germany | 502/207 |
| 9215 | 1/1981 | Japan | 502/207 |
| 2010309 | 6/1979 | United Kingdom . | |

*Primary Examiner*—Patrick P. Garvin
*Attorney, Agent, or Firm*—Cushman, Darby & Cushman

[57] ABSTRACT

A finely divided nickel boride hydrogenation catalyst which is stabilized with an organic linear polymer dispersed in a fatty substance like a triglyceride oil or a fatty amide is provided. The catalyst is stable upon storage and has a good selectivity. This catalyst yields excellent results in hydrogenation processes.

10 Claims, No Drawings

NICKEL BORIDE-POLYMER IN-OIL CATALYST

The invention relates to hydrogenation catalysts, more particularly to finely divided nickel boride catalysts which are stabilised by means of an organic linear polymer, and to the use of such catalysts.

Nickel boride catalysts are known in the prior art. E.g. accordingly, German "Offenlegungsschrift" (DE-A) No. 2 835 943 describes colloidal metal catalysts of the 8th sub-group of the Periodic Table which are incorporated in a solution of a linear polymer. All the examples concern precious metal catalysts and water or methanol is used as solvent. Example 15 describes the complete hydrogenation of linoleic acid and oleic acid to stearic acid with such catalysts.

U.S. patent specification (US-A-) No. 4,327,235 discloses colloidal nickel boride catalysts in alcohol with polyvinylpyrrolidone as protective colloid, as well as the use thereof in the hydrogenation of unsaturated compounds which have a double bond on a tertiary carbon atom. This double bond is hydrogenated without any other double bonds which are possibly present being affected.

European Patent Specification (EP-B-) No. 8407, which is not a prior publication, describes in Examples 22 and 23 the preparation of nickel boride catalyst stabilized with polyvinylpyrrolidon in n-propanol which is then used to hydrogenate Becel oil.

German "Offenlegungsschrift" (DE-A) No. 3 226 865, which is not a prior publication, describes a process for the preparation of metal catalysts from Group 8 of the Periodic Table in particular palladium or platinum stabilized with a polymer like polyvinylalcohol or polyvinylpyrrolidone in which process the catalyst is prepared and activated in an aqueous medium after which an organic solvent is added and the water removed by evaporation off. The solvent can be the compound to be hydrogenated e.g. oleic acid. This publication relates clearly to catalysts prepared and reduced in aqueous media i.e. precious metals.

The present invention now provides a colloidal nickel boride catalyst which is stabilised with an organic linear polymer, which catalyst is dispersed in a fatty substance, preferably a triglyceride oil or a $C_{14}$-$C_{22}$ fatty nitrile. In this form the catalyst is very stable and, when air is excluded, can be stored for a prolonged period with the activity remaining unimpaired. Moreover, the catalyst can be used to excellent effect for the hydrogenation of unsaturated triglycerides. In the hydrogenation of such triglycerides, the very good selectivity is striking, so that very little triglyceride with only saturated fatty acid groups are formed, while the remaining unsaturated bonds predominantly have the cis-structure.

Also, the catalyst when dispersed in oil (rather than in alcohol) displays few or no undesired side-reactions during hydrogenation such as alcoholysis. The nickel boride is preferably very finely divided in with the fatty substance e.g. triglyceride and the average particle size lies between 0.5 and 10, preferably between 1 and 5 nanometers.

The amount of linear organic polymer in the oil suspension of the catalyst is as a rule between 0.2 and 8%, preferably between 0.5 and 5 by weight, and the amount of nickel boride, calculated as nickel, is from 0.1-5%, preferably between 0.3 and 4% by weight. In the catalyst system the atomic ratio of boron with respect to nickel is between 1-5:1, preferably 1.5-3:1.

As a rule, a linear polymer is used as the stablizing polymer. It is preferred to use vinylpyrrolidone containing polymers, more in particular polyvinylpyrrolidone and polyvinylacetate/polyvinylpyrrolidone copolymers. The average molecular weight of the stabilizing polymer is preferably between 10,000 and 150,000.

The fatty substance in which the catalyst is suspended is preferably liquid at room temperature (20° C.) and therefore an unsaturated triglyceride like e.g. soya bean oil, optically partially hardened, is preferably used. Also fatty nitriles can be used.

The catalyst according to the invention can be prepared by adding an alcoholic (methyl-, ethyl- or propyl alcohol) solution of alkaliborohydride to an alcoholic solution of a nickel salt in an atomic ratio B:Ni=1.5-3:1, of which at least one of the solutions contains the organic linear polymer dissolved in it and, in an atmosphere of hydrogen or inert gas at a temperature between 0° and 80° C., preferably between 20° and 60° C., finely divided nickel boride is formed, characterized in that, after termination of this reaction, a fatty substance is added to this system. After addition of this substance (e.g. triglyceride) oil, preferably under stirring, the alcohol is removed, e.g. by vacuum distillation.

Suitable nickel salts are salts sufficiently soluble in alcohol, like nickel chloride hexahydrate and nickel sulphate heptahydrate.

The invention furthermore covers a process for the hydrogenation of unsaturated compounds such as tri glycerides, fatty acids, nitriles and other derivatives in which nickel boride with a stablizing linear organic polymer dispersed in oil is used as hydrogenation catalyst.

As a rule, between 10 and 1500 p.p.m., preferably between 20 and 500 p.p.m. nickel as nickel boride is used (p.p.m. is mg Ni/kg fatty substance). The hydrogen pressure is between 100 and 5000 kPa and the mixture is stirred. The temperature at which hydrogenation is carried out is between 20° and 180° C. After termination, the catalyst and the polymer can be easily removed, e.g. by washing with a diluted acid solution, e.g. citric acid, and possible post-treatment with some bleaching earth or by distillation in the case of volatile compounds.

EXAMPLE 1

The catalyst was prepared in a Schlenk reactor which was connected to a gas burette.

An ethanol solution (16 ml), which contained 6.9 millimole $NaBH_4$, was added to an ethanol solution (34 ml) which contained 2.5 millimole $NiCl_2.6H_2O$ and 240 mg polyvinylpyrrolidone with an average molecular weight of 90.000. This addition took place at room temperature and in a hydrogen atmosphere and resulted in the formation of nickel boride as a brown-black solution. The reaction displayed an induction period of 1-2 seconds and was finished after 15 minutes. The nickel boride solution thus prepared contained 0.3% nickel boride calculated as nickel. 15% by weight of soya bean oil was added to the nickel boride solution thus prepared and the ethanol was evaporated off under decreased pressure and under stirring. The nickel boride dispersion in oil thus prepared, which contained 3% of polymer and 2% of nickel boride, appeared to be a very active and selective hydrogenation catalyst which, moreover, could be stored for at least four months without appreciable loss of activity. The product was amorphous towards x-ray analysis and with electron microscopy no particles were observed exceeding a particle size of 2 nanometers.

EXAMPLE 2

A catalyst was prepared as described in Example 1, however 2.5 millimole of $NiCl_2.6H_2O$ and 240 mg polyvinylpyrrolidone with an average molecular weight of 40,000 were used. After reduction in ethanol, 15% by weight of soya bean oil was added and ethanol removed by evaporation under vacuum whilst stirring. The catalyst so obtained was active and very stable upon storage.

EXAMPLE 3

A catalyst was prepared as described in Example 1, now, however, using polyvinylpyrrolidone of an average molecular weight of 15,000 and the catalyst was taken up in 15% by weight of soyabean oil. This catalyst also was very active and stable upon storage.

EXAMPLE 4

A catalyst was prepared as described in Example 1, however using 2,5 millimoles $NiCl_2.6H_2O$ and 500 mg polyvinylpyrrolidone with an average molecular weight of 90,000 followed by reduction with a solution in ethanol of sodiumborohydride at a temperature of 55° C. Subsequently 15% by weight of cotton seed oil was added and the alcohol removed by evaporation under vacuum. The catalyst suspension was stable and active.

EXAMPLE 5

A catalyst was prepared as described in Example 1. However, after the reduction of the nickel salt has taken place an equal volume of soyabean oil was added and the alcohol was removed by evaporation under reduced pressure. The suspension now contained 0.3% of nickel boride calculated as nickel and 0.45% of polymer.

EXAMPLE 6

A catalyst was prepared as described in Example 1 however after reduction the catalyst in alcohol 15% by weight of purified fish oil were added and the alcohol removed. This nickel boride (2%) stabilized with polyvinylpyrrolidone taken up in purified fish oil proved to remain active for several months.

EXAMPLES 7-12

The catalyst suspended in soya bean oil as described in Example 1 was compared at 110° C. with a commercial nickel catalyst with kieselguhr as carrier and having an activity of 150% in the fish oil test as described more fully in Example 14. The hydrogenation of soya bean oil (having iodine number 133) was carried out at 110° C. and 500 kPa hydrogen pressure in an autoclave of 0.3 liters volume, which was with stirring at 1500 r.p.m. With an input of 50 mg Ni/kg oil of the PVP-nickel boride catalyst of Example 1 an iodine number of 98 was reached in 64 minutes. With a commercial nickel-on-kieselguhr catalyst with a double nickel input only an iodine number of 120 was reached in 70 minutes.

After the hydrogenation with nickel boride, the oil was washed with a 2% solution of citric acid in water for 20 minutes at 45° C. under stirring. After separation, the oil was washed twice more with 30% by volume of water. After separation and filtration over bleaching earth the oil still contained 0.02 p.p.m. nickel and less than 1 p.p.m. polyvinylpyrrolidone (PVP).

In a similar way hydrogenations were carried out with soya bean oil (I.V. 133) using the catalysts described in Examples 2-6. The results are tabulated below.

| Example | 7 | 8 | 9 | 10 | 11 | 52 |
|---|---|---|---|---|---|---|
| Oil hydrogenated | Soya bean | Soya bean | Soya bean | Soya bean | Soya bean | Fish |
| Iodine value when starting | 133 | 133 | 133 | 133 | 133 | 133 |
| Nickel load (mg/Kg oil) | 50 | 50 | 50 | 50 | 50 | 200 |
| Type of catalyst used | Ex.1 | Ex.2 | Ex.3 | Ex.4 | Ex.5 | Ex.6 |
| Hydrogenation temp. (°C.) | 110 | 110 | 110 | 110 | 110 | 110 |
| $H_2$ pressure (KPa) | 500 | 500 | 500 | 500 | 500 | 500 |
| Hydrogenation time (min.) | 64 | 60 | 67 | 45 | 70 | 130 |
| I.V. reached | 98 | 99 | 96 | 98 | 95 | 75 |

EXAMPLE 13

With the catalyst suspended in soya bean oil as described in Example 1, rapeseed oil was hydrogenated under the same conditions as described in Example 7. With a catalyst load calculated as 150 mg nickel per kg oil, rapeseed oil having an iodine number of 117 could be hydrogenated to an iodine number of 95 in 70 minutes.

EXAMPLE 14

Fish oil having an iodine number of 161 was hydrogenated in order to test the activity of the catalyst. 150 g fish oil was hydrogenated in a so-called Normann beaker (a stirred metal reactor of 0.3 liters volume) with a load of 0.06% nickel boride (calculated as nickel) and prepared according to Example 1. The reaction mixture was stirred at 3000 r.p.m. and a hydrogen pressure of 100 kPa was applied. The hydrogenation lasted 30 minutes at a temperature of 180° C. From the drop in the refractive index of the hydrogenated oil thus obtained with respect to the index of the starting oil, it appeared that the activity of the catalyst was a good 220% of the activity of a current commercial nickel-on-kieselguhr catalyst.

EXAMPLE 15

Fish oil having an iodine number of 161 was hydrogenated with the catalyst of Example 1 in order to test the selectivity of the catalyst. According to a standard procedure, 250 g fish oil was hydrogenated in a so-called Normann beaker, the temperature being increased in 1 hour from 140° to 180° C. The stirring speed was 750 r.p.m. and 60 liters hydrogen gas per hour was injected. The hydrogenation was stopped upon reaching iodine number 78 and the product was compared with fish oil which had been hydrogenated to the same iodine number with a current commercial standard nickel-on-kieselguhr catalyst. These data are given in the table below:

| Catalyst | Nickel load (percentage nickel on oil) | Hydrogenation time (min.) | Percentage solid phase | | |
|---|---|---|---|---|---|
| | | | $n_{20}$ | $n_{30}$ | $n_{35}$ |
| commercial standard catalyst | 0.11 | 178 | 34 | 8 | 3.5 |
| PVP—Ni boride | 0.07 | 105 | 20 | 5 | 0 |

EXAMPLE 16

A nickel boride-polyvinylpyrrolidone catalyst was prepared as described in Example 1 and to this catalyst 30% by weight of tallow fatty acid nitrile was added, and subsequently the alcohol was removed by evaporation. The nickel polyvinylpyrrolidone catalyst containing 1% of nickel proved to be stable upon storage.

EXAMPLE 17

The catalyst of Example 16 was used to reduce 70 grams of tallow fatty acid nitrile to amines and compared with a commercially available Raney nickel catalysts often used for this reduction. The results are tabulated below. It was evident that the nickel boride catalyst of the Example 16 was an active and selective catalyst for the preparation of primary amines.

| Catalyst | Nickel load (% Ni) | P(NH$_3$) (KPa) | P(H$_2$) (KPa) | T(°C.) | Reaction time (h) | prim. amine (%) | sec. amine (%) | tert. amine (%) | selectivity (%) |
|---|---|---|---|---|---|---|---|---|---|
| Raney Ni 1 | 0.18 | 1500 | 1500 | 130 | 1¼ | 53 | 6 | trace | 90 |
| Raney Ni 1 | 0.25 | 2000 | 2000 | 150 | 1 | 84 | 15 | 1 | 85 |
| Raney Ni 2 | 0.18 | 1500 | 1500 | 130 | 2 | 87 | 13 | trace | 87 |
| Nickel-boride Ex. | | | | | | | | | |
| 16 | 0.18 | 1500 | 1500 | 130 | 1 | 99 | 1 | trace | 99 |
| 16 | 0.12 | 1500 | 1500 | 130 | 1 | 96 | 4 | trace | 96 |
| 16 | 0.09 | 1500 | 1500 | 130 | 1½ | 57 | 8 | below 1 | 84 |
| 16 | 0.06 | 1500 | 1500 | 130 | 1½ | 64 | 2 | below 2 | 96 |

We claim:

1. A finely divided nickel boride catalyst stabilized with a linear organic polymer, characterized in that nickel boride with a stabilizing linear organic polymer is suspended in a fatty compound.

2. A catalyst according to claim 1, characterized in that the nickel particles have an average size ranging between 0.5 and 10 nanometers.

3. A catalyst according to claim 1, characterized in that the fatty compound is an unsaturated triglyceride.

4. A catalyst according to claim 1, characterized in that the linear organic polymer is based on vinylpyrrolidone.

5. A catalyst according to claim 1, chracterized in that the linear organic polymer has an average molecular weight ranging between 10,000 and 150,000.

6. A catalyst according to claim 1, characterized in that the fatty compound contains from 0.2 to 8% by weight of organic polymer and from 0.1-5% of nickel boride (calculated as nickel).

7. A process for the preparation of a finely divided nickel boride catalyst according to claim 1, in which an alcoholic solution of alkali borohydride is mixed with an alcoholic solution of a nickel compound, and of which at least one of the solutions also contains an organic linear polymer and, in a hydrogen atmosphere or an inert gas atmosphere at a temperature between 0° and 80° C., by which finely divided nickel boride is formed, characterized in that after termination of the reduction a fatty compound is added to this composition and the alcohol is removed by evaporation.

8. A process according to claim 7, characterized in that the linear organic polymer contains vinylpyrrolidone groups.

9. A catalyst according to claim 6 wherein the fatty compound contains from 0.5-5% by weight of organic polymer.

10. A process according to claim 7 wherein the alcoholic solutions are mixed at a temperature between 20 and 60° C.

* * * * *